C. BURNETT.
HOG OILER.
APPLICATION FILED SEPT. 15, 1919. RENEWED FEB. 1, 1921.
1,389,435. Patented Aug. 30, 1921.
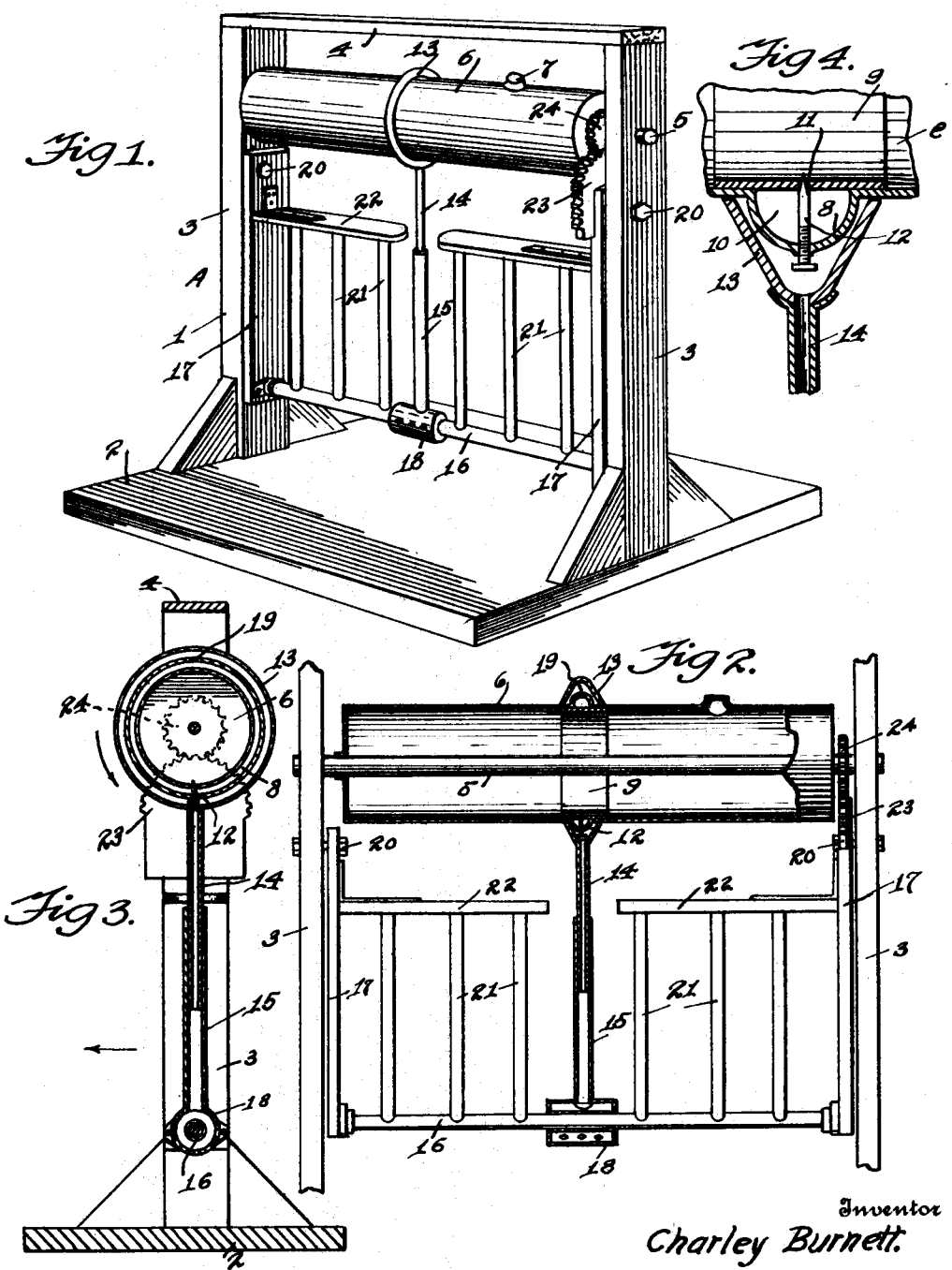
Inventor
Charley Burnett.
Witness
A. Sundell
By
C. Shepherd, Attorney

UNITED STATES PATENT OFFICE.

CHARLEY BURNETT, OF WASHINGTON COURT HOUSE, OHIO.

HOG-OILER.

1,389,435.   Specification of Letters Patent.   Patented Aug. 30, 1921.

Application filed September 15, 1919, Serial No. 323,931. Renewed February 1, 1921. Serial No. 441,676.

*To all whom it may concern:*

Be it known that I, CHARLEY BURNETT, a citizen of the United States, residing at Washington Court House, in the county of Fayette and State of Ohio, have invented certain new and useful Improvements in Hog-Oilers, of which the following is a specification.

This invention relates broadly to disinfectant devices, and has particular reference to an improved disinfectant device primarily adaptable for use in oiling or disinfecting hogs so that the latter will be freed of vermin and like health destroying insect life.

The primary object of the invention resides in the provision of a hog oiler wherein is provided a frame having a tiltable disinfectant containing tank, and to provide a depending pivotally mounted frame which when struck or engaged by an animal will oscillate said tank so that the disinfectant contained in the latter will be sprayed or directed upon the animal rocking the frame.

A further object resides in mounting the tiltable tank and its pivoted actuating frame upon separate fulcrums and to provide means in conjunction therewith whereby the oscillatory motion of the actuating frame will be multiplied when transmitted to the tank.

A still further object resides in providing the tank with a surrounding passageway into which the liquid disinfectant is introduced by means of a valved port and to provide a spout in connection with the passageway whereby when the tank is tilted to a predetermined degree, the contents of said passageway will be discharged into said spout and thence direct into contact with the animal.

The nature and all of the various objects of the invention will be understood in detail from the following description in connection with the drawing.

Figure 1 is a perspective view of a hog oiler or disinfectant device constructed in accordance with the principles of the invention.

Fig. 2 is a transverse vertical sectional view taken through the device.

Fig. 3 is a vertical longitudinal sectional view, and,

Fig. 4 is a detailed sectional view setting forth the valve structure for controlling the flow of the disinfectant from the tank into the surrounding passageway.

Referring more particularly to the details of the invention, use is made of a hog oiler A, which in its preferred form consists of a supporting frame 1. This frame may embody a base 2, up-standing side rails 3 and an upper and transverse connecting bar 4. The frame is preferably located in an aisleway, not shown, in order that the animals may be driven through the aisleway and will be forced to come in contact with the oil.

Journaled for rotation within the upper portions of the side rails 3 is a horizontally extending shaft 5, to which is concentrically and rigidly secured a tiltable disinfectant tank 6. This tank is adapted to contain any suitable quantity of liquid hog oil or disinfectant, and the fluid may be introduced into the tank by means of a capped supply opening 7. Formed centrally of the tank 6 is a corrugation or bead 8 and situated internally of the tank and in concentric registration with the bead or corrugation is an internal band 9, which latter in conjunction with the part 8 serves to define an annular chamber 10 around the tank. The fluid contained within the tank is introduced into the chamber 10 by means of a port 11 formed in the band 9, and this port is capable of having its working area varied by means of an adjustable needle valve 12. By regulating the valve, more or less of the fluid within the tank may flow into the chamber 10 so that the amount of liquid discharged from the tank under any one operation will be capable of being controlled.

Loosely mounted upon the tank 6 and surrounding the corrugation or bead 8 is a circular collar 13 which terminates in a downwardly extending spout 14, the lower end of the latter being telescopically received within a similar spout 15 carried by the lower rung 16 of a pivoted actuating frame 17. The extreme lower end of the spout 15 terminates in a perforated discharge sleeve 18, which is carried by the rung 16, and it will be obvious that fluid discharged from the chamber 10 by way of a port 19 formed in the upper portion of the bead 8 will be deposited into the annular collar 13 and will thence flow through the associated spouts 14 and 15 and will be discharged from the oiler by way of the perforated sleeve 18, When the tank is normally situated, the liquid levels within the tank and the chamber 10 are substantially uniform, however, in order that the liquid within the chamber may be discharged into the concentrically located collar by way of the port 19, it is necessary to substantially invert the tank in order that the contents of the chamber 10 may readily flow out of the latter. To this end, the actuating frame 17 is pivoted as at 20 at a point below the shaft 5 to the side rails 3, and said frame is formed to include vertical rungs 21 which connect the lower rung 16 with the upper rung 22, thus the frame presents an obstruction in an aisle or runway which an animal must oscillate before passing through the aisle or runway. The contacting of the animal with the frame 17 results in the oscillation of the latter, and this movement of the frame is imparted to the tank by providing one side of the frame with a gear segment 23, the latter being disposed to mesh with a gear 24 of considerably smaller diameter carried by and rotatable with the shaft 5. From this it will be manifest that the oscillation of the frame will result in considerable multiple tilting movement on the part of the tank, so that the port 19 of the bead 8 will assume an inverted position permitting of the free flow of the disinfectant into the collar 13, from which it is directed by means of the spout structure to the discharge sleeve.

From the foregoing description taken in connection with the accompanying drawing, it will be seen that there is provided a hog oiler of considerable utility and one wherein are combined reliable and positive features of operation with accompanying simplicity in construction. By use of the gearing 23 and 24, a positive discharge of fluid from the tank into the spout structure is provided with but a minimum of movement on the part of the frame 17, this feature serving to accommodate the device to both large and small animals. By telescoping the spout structures 14 and 15, the different axes of swinging movement thereof are taken care of and binding between parts is prevented.

I claim:

1. A disinfectant apparatus comprising a supporting structure, a fluid containing tank tiltably supported by said structure, a frame for rocking said tank carried by a fulcrum spaced from the fulcrum of said tank, gear means coöperative with said frame and tank to multiply the motion of the latter when rocked by said frame, a member surrounding said tank and defining an annular chamber, valve mechanism for controlling the flow of fluid from said tank into said chamber, said member being provided with an aperture, and a spout structure conjointly carried by said tank and frame and disposed to surround said chamber, whereby upon the oscillation of said tank, said member aperture will be positioned to discharge fluid from said chamber into said spout structure.

2. A hog disinfectant device comprising a supporting structure, a fluid containing tank tiltably supported by said structure, and having a central journaling shaft, a frame pivotally supported by said structure and disposed in spaced relation with respect to said shaft, gear mechanism situated between said frame and said shaft whereby upon the oscillation of said frame, rotary movement will be imparted to said tank, a member surrounding said tank and defining an annular chamber the latter being in communication with the interior of said tank by means of a port, said member being provided with a port substantially in diametrically opposite relation with respect to said first named port, a spout structure surrounding said member and loosely carried by said tank whereby upon the oscillation of the latter, said member port will be capable of discharging fluid into said spout structure, and a coöperating spout structure carried by said frame and arranged for telescoping engagement with the adjusting portions of said tank carried spout structure.

3. A stock oiler comprising a supporting structure, a fluid containing tank tiltably mounted in connection with said structure, a rubbing frame pivotally connected with said structure beneath said tank, means actuated by the oscillation of said frame to impart relatively multiplied rotative movements to said tank, a member surrounding said tank and defining a supplemental fluid receiving chamber having communication with the interior of said tank, the upper portion of said member having a fluid discharge port formed therein, and a telescopic spout structure coöperatively carried by said tank and frame and situated to receive the contents of said chamber by way of said port upon the tilting of said tank.

In testimony whereof I affix my signature.

CHARLEY BURNETT.